A. D. TYLER.
Elastic Rubber Tool Holder or Handle.

No. 224,251. Patented Feb. 3, 1880.

Witnesses.
D. S. Chapin
H. S. Bellows

Inventor.
A. D. Tyler
Per Brown Bros
Attorneys.

UNITED STATES PATENT OFFICE.

ABEL D. TYLER, OF BROCKTON, MASSACHUSETTS.

ELASTIC RUBBER TOOL HOLDER OR HANDLE.

SPECIFICATION forming part of Letters Patent No. 224,251, dated February 3, 1880.

Application filed October 18, 1879.

*To all whom it may concern:*

Be it known that I, ABEL D. TYLER, of Brockton, in the county of Plymouth and State of Massachusetts, have invented certain new and useful Improvements in Tool-Holders, of which the following is a full, clear, and exact description.

Under this invention this improved tool holder or handle, first, is made of india-rubber—of any of its elastic compounds—molded and vulcanized about the tang of a tool, which tang is suitably constructed to secure an interlock with it of the india-rubber compound as it is molded and vulcanized about the same; second, it is made of india-rubber—of any of its elastic compounds—molded and vulcanized, with an opening to afterward receive the shank of the tool which it is to carry and in a manner to enable an elastic and compressive action and gripe of the india-rubber about and on the tang of the tool so inserted in said opening; third, it is made of india-rubber—of any of its elastic compounds—molded and vulcanized, with an opening to afterward receive the shank of the tool which it is to carry, and with a metal sheathing to such opening, all in a manner to insure an elastic and compressive action and gripe of the said metal sheathing about and on the shank of the tool so inserted in such metal-sheathed opening; fourth, the said metal sheathing is constructed for an interlock between it and the said india-rubber handle or holder; fifth, the shank of the tool and said metal sheathing are relatively constructed to secure an interlock of the shank with the sheathing, all substantially as hereinafter described.

Figure 1:
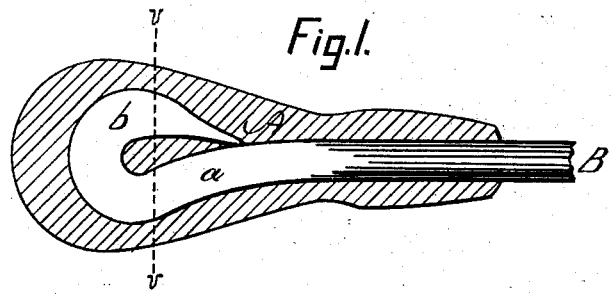
Figure 2:
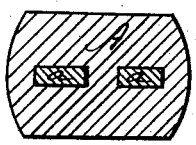
Figure 3:
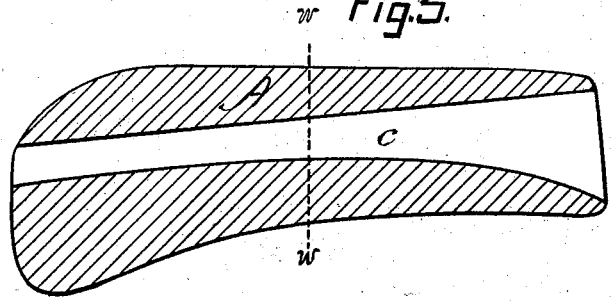
Figure 4:
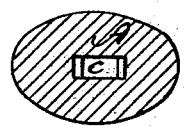
Figure 5:
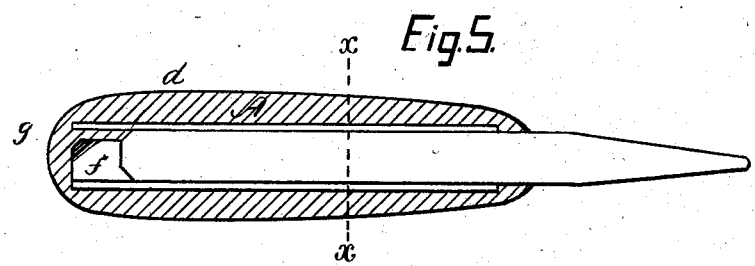
Figure 6:
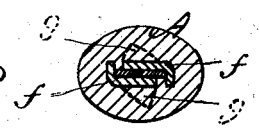
Figure 7:
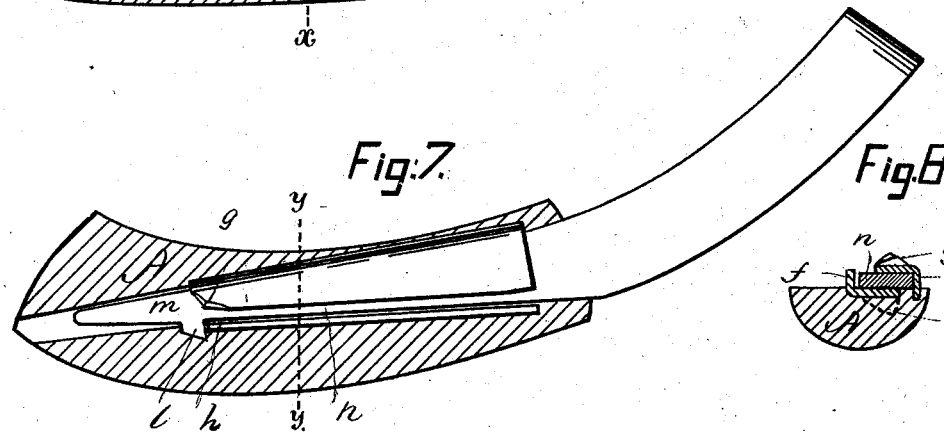
Figure 8:
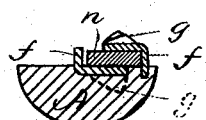

In the accompanying plate of drawings, Figure 1 is a longitudinal sectional view of my improved tool holder or handle, with the tool and its tang in face view, illustrative of the first feature of my invention; Fig. 2, a cross-section on line *v v* of Fig. 1; Fig. 3, a longitudinal section of my improved tool holder or handle, showing it as molded and vulcanized in accordance with this invention, with an opening to afterward receive the tang of a tool; Fig. 4, a cross-section on line *w w* of Fig. 3; Fig. 5, a longitudinal section of my improved tool holder or handle, having a metal sheathing to the opening, which, with the tool, is shown in face view; Fig. 6, a cross-section on line *x x* of Fig. 5; Figs. 7 and 8, similar views to Figs. 5 and 6, but showing the metal sheathing constructed for its interlock with the india-rubber handle, and for an interlock together between it and the tang of the tool when the tang is inserted, but in Fig. 8 with one side of the handle removed.

In the drawings, A, Figs. 1 and 2, represents a tool handle or holder composed of india-rubber, in any of its elastic compounds, which is molded and vulcanized of the desired external shape and size about the tang *a* of the tool B, which is made with a hook or crook, *b*, to secure an interlock between the india-rubber and the tang under the molding and vulcanizing of the india-rubber, and thus the better attachment and fastening of the two together—that is, of the tang and holder.

The tool holder or handle A (shown in Figs. 3 and 4) is made of india-rubber, in any of its elastic compounds, molded and vulcanized of the desired shape and size externally, and with an opening, *c*, in it running in the proper direction relative to the shape of the handle, for the after reception of the tang of the tool which it is to carry, said tang being driven into said opening, and said opening being, in relation to said tang, of such size as to secure an elastic and compressive gripe of the india-rubber upon the said tang so driven, and thereby obtain a proper and secure hold and grasp of the tang by the holder, preventing the accidental escape of the tool from its holder, while at the same time, by pulling outwardly on the tool, it can be adjusted as it wears away—as, for instance, if the tool be a knife-blade, or be wholly detached, and another one be inserted in the same holder.

In Figs. 5 and 6 the tool-holder A there shown is similar in construction and manufacture to that shown in Figs. 3 and 4, but in addition thereto has an opening, *d*, sheathed with metal *f*, which metal is in two parts or sections in its length, so that the same may open and give or yield with the india-rubber as the tang of the tool is driven into the opening sheathed with said metal. This metal sheathing also, in Figs. 7 and 8, is shown as provided with ear-pieces *g g*, one or more to each section or part, which ear-pieces project into the body of the india-rubber handle, and thus secure an interlock of the sheathing with the handle. This interlock of the sheathing and rubber obviously may be secured by perforations in the metal, causing the rubber to project into the sheathing, instead of the sheathing into it.

The metal sheathing shown in Figs. 7 and 8 makes, at the inner end, $h$, of one of its parts, an abutment or stop for the hook $l$ near the inner end, $m$, of the tang $n$, to catch upon when the tang is inserted, and secure an interlock between the tang and the handle within the handle when the tang is driven in.

The manufacture of a handle or holder in either of the several forms herein described is by the molding and vulcanizing of the india-rubber as ordinarily, and when the same is made for the after attachment of the tool thereto, as herein described, a suitable core is employed to give the opening $c$ in the handle desired, about which core, if a metal sheathing, $f$, is to be provided to the said opening $c$, such sheathing is placed before molding and vulcanizing the india-rubber, and in all cases where a core is used, as above stated, such core is removed after the molding and vulcanizing are completed.

A tool holder or handle made in accordance with this invention obviously is suitable for a variety of tools, such as screw-drivers, knife-blades, awls, &c., and is especially adapted to be used for handles of farriers' knives.

Instead of the hook or crook $b$, shown in Figs. 1 and 2, perforations may be made in the tang to secure the interlock of it with the molded rubber handle.

Having thus described my invention, what I claim, and desire to secure by Letters Patent, is—

1. A tool holder or handle made of india-rubber, in any of its elastic compounds, vulcanized on the tang of the tool, which is shaped to interlock with the india-rubber, all substantially as described and for the purpose specified.

2. A tool-holder composed of india-rubber, in any of its elastic compounds, vulcanized, and provided with an opening, $c$, to receive the tang to the tool, adapted to hold the same with an elastic and compressive gripe, substantially as and for the purpose specified.

3. The combination, with a tool-holder, A, composed of india-rubber, in any of its elastic compounds, vulcanized, and provided with an opening, $c$, of a metal sheathing, $f$, to said opening, in parts or sections, all substantially as and for the purpose specified.

4. The metal sheathing $f$, constructed to interlock with an india-rubber holder which is molded and vulcanized, substantially as described, for the purpose specified.

5. The elastic india-rubber handle having an opening, $d$, which is sheathed with metal $f$ in parts, and is adapted to interlock with the tang of the tool inserted in said opening $d$, substantially as described, for the purpose specified.

ABEL D. TYLER.

Witnesses:
EDWIN W. BROWN,
W. S. BELLOWS.